Oct. 27, 1959     W. J. ROZMUS ET AL     2,909,951
METHOD AND APPARATUS FOR UNITING TUBULAR MEMBERS
Filed May 10, 1955     3 Sheets-Sheet 1

INVENTORS
WALTER J. ROZMUS
WILLIAM A. BARNES
BY Ray S Pyle
ATTORNEY

Oct. 27, 1959     W. J. ROZMUS ET AL     2,909,951

METHOD AND APPARATUS FOR UNITING TUBULAR MEMBERS

Filed May 10, 1955     3 Sheets-Sheet 2

INVENTORS
WALTER J. ROZMUS
WILLIAM A. BARNES
BY Ray s Pyle
ATTORNEY

United States Patent Office

2,909,951
Patented Oct. 27, 1959

2,909,951

METHOD AND APPARATUS FOR UNITING TUBULAR MEMBERS

Walter J. Rozmus, Whitesboro, and William A. Barnes, Utica, N.Y., assignors, by mesne assignments, to Kelsey-Hayes Company, Detroit, Mich., a corporation of Delaware Application May 10, 1955, Serial No. 507,389

6 Claims. (Cl. 78—82)

The present invention relates to novel means for and methods of cold butt welding rods, wires, strips, tubes, and the like members of cold pressure weldable metal or metal alloys.

It has already been proposed, as described, for instance, in United States Patent No. 2,698,548, to butt weld two members by cold pressure welding.

It has furthermore been proposed, such as described in Patent No. 2,522,408, to spot lap weld a pair of members by applying indenting pressure to the weld area by the aid of suitable pressure tools or dies, to create a metal flow at the interface conducive to welding or merging of the metals.

Although the theoretical background and physical phenomena taking place in the formation of a cold weld joint of this type are not yet fully understood, extensive research and experience indicate that the formation of the cold weld bond is produced by an outwardly moving metal flow between clean interfaces. Simple pressure is not enough. The interfaces must be pressed together very intensely over a surface which is not only in movement but which is fixed in contact, and is expanding in area. The metal flow once started must be continuous and severe in nature. Furthermore the metal of one workpiece must not slide with respect to the mating interface of the other workpiece. For example, a very soft aluminum workpiece would tend to flow over the surface of a harder member such as most copper alloys, rather than flowing with the copper.

Such flow under controlled pressure probably does cause molecular and/or lattice diffusion or interchange between the metals of the two members or to reduce the interface to within molecular dimensions, to effect an intimate contact or merging of the two metals into a mechanically strong solid phase welding bond.

One of the means and techniques to control the metal flow consists in the proper design or shape of the welding tools, such as in the case of indentation lap welding as described by Patent No. 2,522,408.

It has been found that in cold butt welding by pressure only, great care must be exercised in both properly aligning the members prior to welding and to maintain accurate aligning conditions during the welding process. Such care is needed in order to prevent even minute lateral displacement of the interface from a substantially flat surface during welding and other defects interfering with or preventing welding altogether. These difficulties are of an especially serious nature in cold butt welding tubes whether of similar or dissimilar metals.

An object of the present invention is, therefore the provision of means for and an improved method of cold butt welding two members by which the aforementioned and related difficulties are substantially overcome or minimized.

A more specific object of the invention is to provide improved apparatus for cold butt welding metal tubing, insuring proper alignment of the workpieces and substantially eliminating lateral movement or skidding during welding and to overcome other drawbacks and difficulties encountered in the cold butt welding of metal tubes.

It has been found that butt welding of tubing was not dependably successful when pressed together, even with dies which were made with greatest care. It was discovered thereafter that proper alignment of the ends of the tubing was not always accomplished. It was found that even a few thousandths of an inch out of perfect abutment would cause the tubing ends to skid sideways and fail to weld. Therefore, alignment of tube ends must be maintanied within close limits. This is the primary object of the present invention.

Other objects and a fuller understanding of the invention may be had by referring to the following description and claims, taken in conjunction with the accompanying drawings, in which:

Figure 1:
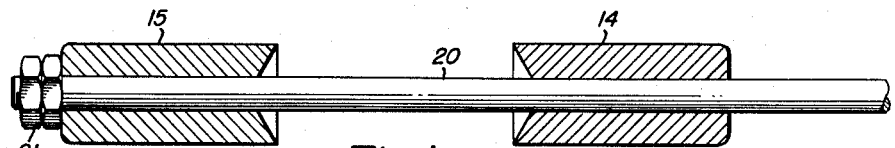
Figure 1 is a side view of two mandrels slidable upon a common guide rail rod, the plugs being in section to illustrate the flash forming relief surfaces.

In the drawings there is illustrated the preferred embodiment of the die construction embodying the features of this invention. As illustrated, there are two composite dies 10 and 11 composed of tapered outer dies 12 and 13 with inner plug dies 14 and 15 associated therewith.

In Figure 1 of the drawings, the preferred embodiment of the inner dies and associated guiding structure is set forth separate from the composite dies. As explained previously herein, it is necessary to provide for almost perfect alignment of the butt ends of tubular members in order to achieve a good weld. During the welding operation there are extreme forces operating in a lateral direction which tend to move the abutting surfaces out of proper relationship, even when originally perfectly aligned. Accordingly, the inner or plug dies 14 and 15 are illustrated as being slidably mounted upon a guide rail rod 20 extending through the axis of the plug dies 14 and 15. In Figure 1 both dies 14 and 15 are slidably mounted upon the rod 20 and a composite nut and lock nut 21 serve as a retainer to keep the slidable plug dies upon the rod. By the provision of a true rod 20, the dies 14 and 15 will be held to an exact re.ative movement, and accordingly will hold any tubular member carried over the dies in a fixed relative path.

The outer dies 12 and 13 are preferably made in tapered form in order to conveniently fit into suitable sockets in carriages 16 and 17. The sockets are indicated by the reference characters 18 and 19. Thus, as force is exerted upon the face of the dies, they will be seated into the sockets. The outer dies 12 and 13 are split, and accordingly such movement into the sockets will cause the dies to close down to grip a workpiece positioned therein. Any suitable driving mechanism may be employed to move the carriages 16 and 17 in a work path toward and away from one another provided that such driving means produces a sufficiently intense force which will maintain the workpiece fixed in contact, and continuous in its movement in order that the metal flow once started will be continuous and severe in nature.

Figure 2:
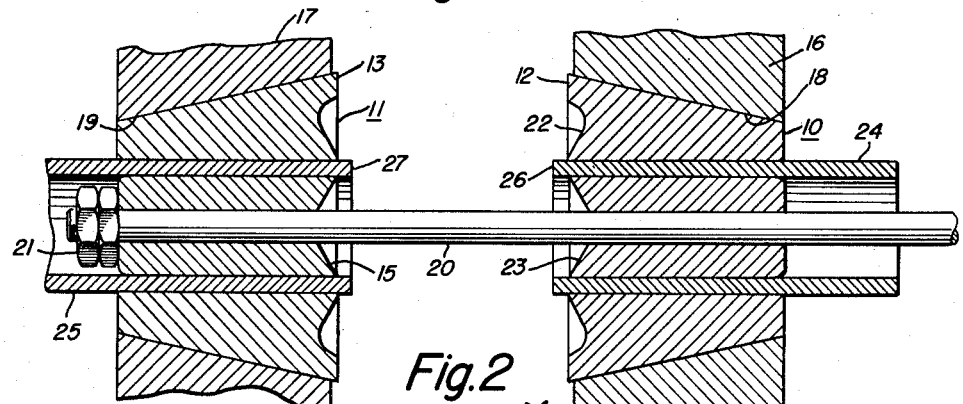
Figure 2 is a section through two composite die members, including the mandrels of Figure 1, and with two sections of tubing to be joined mounted therein, the outer dies being split tapered dies with the interface along the plane of view.

The plug dies 14 and 15 are carried centrally of the split outer dies 12 and 13 respectively, as pictured in Figure 2, and therefore the outer surface of the plug dies and the inner surface of the outer dies define an annular space in which tubes 24 and 25 may reside. As the welding action begins, the tapered outer dies will close down upon the space and thus will cause a tight gripping force to be exerted upon the tubes 24 and 25.

According to the concept of welding at temperatures less than the thermo welding temperatures for a given metal, but under high pressures which cause the continuous and severe flow of metal, a provision must be made for a place for the metal to flow. According to Sowter Patent No. 2,522,408 and subsequent patents issued thereafter, the value of a given weld will be determined in large measure by the unrestricted flow of metal either sideways away from the weld point or into the thickness of the metal when welding sheet. It has been found that many of the principles with regard to welding sheets and similar overlapping structures as set forth by Sowter, cannot be applied exactly to the butt welding of tubular members. Moreover, it has been discovered and fully substantiated that the interfaces must be pressed together very intensely over a surface which is not only in movement, but which is fixed in contact and is expanding in area. Accordingly, face recesses 22 and 23 provided on composite die 10 illustrate a suitable recess in the die surface which will permit metal from the tubes 24 and 25 to expand and move as specified. It has further been discovered that acceptable welds require that the metal flow from the center outwardly in both directions. Welding of tubes may be likened to the welding of a flat sheet except that the sheet is rolled into tubular form. Accordingly, in the joining of the tubes 24 and 25 the butt face ends 26 and 27 are squared as perfectly as possible with the body of the tubes, and if necessary made free of oxides and other contaminants by scratch brushing or machining away part of the end surface, such as by cutting the tube to produce a fresh end. The end of the tubing is then allowed to project beyond the face of the composite dies. Therefore, as the dies 10 and 11 close together, the surfaces 26 and 27 will be first to contact. An acceptable degree of perfection in this contact is provided by the insertion of the plug dies 14 and 15 into the ends of the tubular members as illustrated in Figure 2.

After contact of the ends 26 and 27, the force as specified must be severe and continuous. Such movement will cause the metal to deform and begin to flow, and consequently will produce extreme lateral forces. However, it has been found that the rod 20 will hold the plug dies 14 and 15 rigidly in their prescribed position, and consequently the tubular members will also be confined to acceptable limits of movement.

Figure 3:
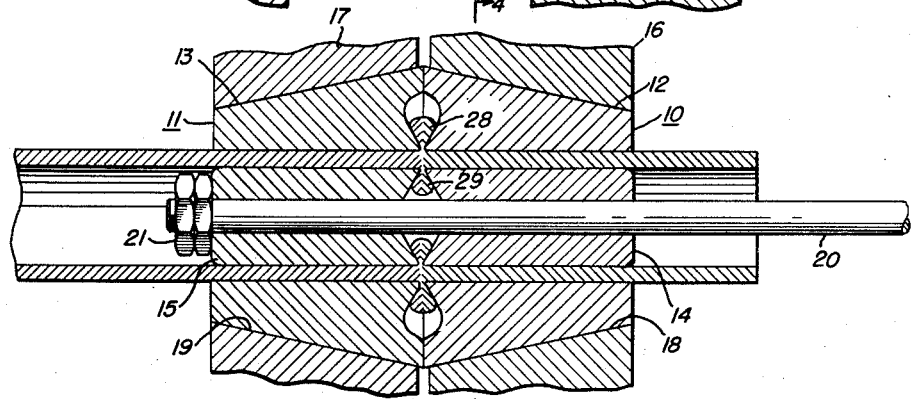
Figure 3 is a section similar to Figure 2, with the dies closed and a butt weld formed.
Figure 4:
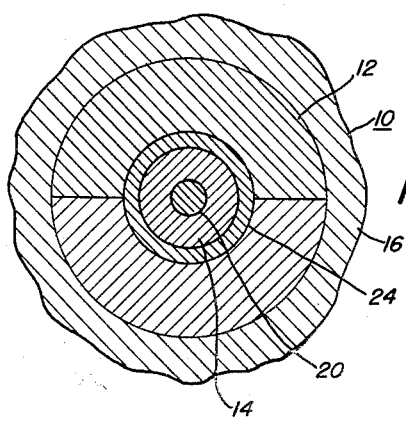
Figure 4 is a section taken along line 4—4 of Figure 3.

The closing of dies 10 and 11 is stopped by face to face contact between the dies, and the lateral flow of the material of the tubes is permitted by the provision of the face recesses such as the recesses 22 and 23 in die 10. Such flash is illustrated by the outer flash 28 and the inner flash 29, best seen in Figure 3 of the drawing.

The amount of metal required to flow as a flash will be determined by the material being welded and by the freshness of the face surfaces 26 and 27, among other things. Accordingly, the projection of the tubular members 24 and 25 from the faces of the dies 10 and 11 may be determined by calculation or experience, or both, and provided by the use of suitable stop means while initially positioning the tubular members. Furthermore, the faces of the dies 10 and 11 which contact and stop the welding movement may be relieved to cause a greater flow as wear proceeds. In the Figure 3 the dies appear to be in contact adjacent the surface of the tubes at the base of the weld flashes 28 and 29. Actually there is a slight degree of clearance at these points which cannot be faithfully illustrated in a small drawing without undue exaggeration. However, the degree of clearance is so slight that the flash may be removed manually with a pair of pliers in most instances.

Figure 5:
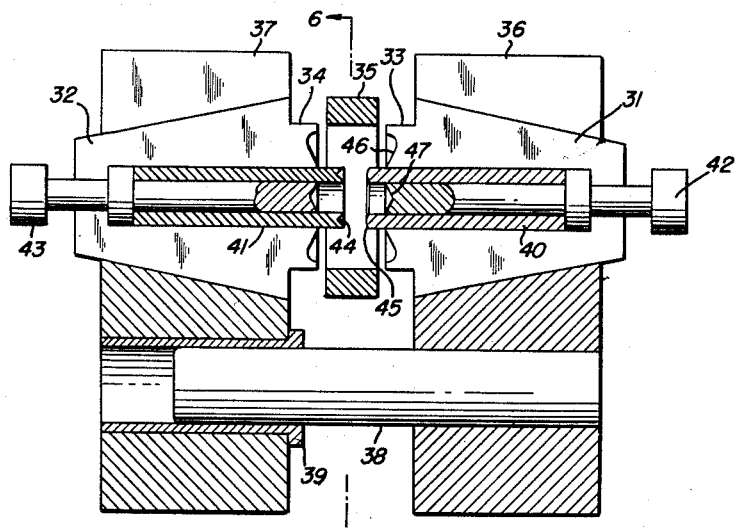
Figure 5 is a sectional view of a modified tooling particularly adapted to workpieces which will not permit central rail guide means, the tooling having a bridging guide device to interconnect the dies as they close.

In Figure 5 there is illustrated apparatus for uniting smaller size tubes and workpieces in which the center mandrel is not sufficiently large to provide space for a central guide rail.

In Figure 5 split and tapered holding dies 31 and 32 are driven through a work cycle path toward and away from one another by means of carriages 36 and 37. Either manual or power driving force may be employed to operate the carriages 36 and 37. Inasmuch as the driving source is not a part of the present invention, such source of driving power is not illustrated.

In the modification of Figure 5, the dies 31 and 32 are provided with annular shoulders 33 and 34, respectively, on the forward ends thereof. These shoulders provide guide surfaces and are proportioned to fit internally within an annular ring 35. Ring 35 therefore serves as a bridging guide rail in cooperation with the guide surfaces provided by the shoulders 33 and 34. In the illustrated form of the tooling as shown in Figure 5, the annular bridge member 35 is a separate member from either of the die devices, and the shoulders 33 and 34 enter into the internal dimension of the annular ring 35 early in the closing movement of the dies and are thereafter accurately guided toward one another in a fixed path, and will successfully resist lateral forces produced by the welding operation.

In order to further aid the accurate alignment of the dies, a pin 38 carried by carriage 36 bridges the gap to the carriage 37, and is slidably carried in a bushing 39 therein.

It has been found that a relatively good alignment of workpieces must be obtained in any butt welding operation producing union by pressure alone without the use of welding temperatures and fluxes, and accordingly the alignment devices of this invention are quite adaptable to all types of butt welding tooling. However, the tooling of this invention has been found to be the factor which spells the difference between success and failure in most tube butt welding applications. It has been found that the butt welding of tubing without the present invention may appear in many instances to be good, but welding failures have indicated that the butting surfaces did not remain in contact without sliding across one another, and did not produce the proper relative expansion laterally during the welding operation. It was then discovered that the welding of tubing requires a considerably greater degree of accuracy in butt contact of tubular members than might be expected, and that regardless of how accurately driving carriages might be aligned and how accurately the dies might be fitted to such carriages, nevertheless acceptable tolerances became multiplied throughout the tool and permitted an unacceptable variance in alignment. Whenever the principles of the present invention were applied, however, acceptable alignment has been attained in each case, and in every instance the welds have been proper and acceptable for their intended purpose. Accordingly, this invention is believed to be incorporated in the concept of alignment of the dies by interconnecting of the dies directly with one another or through appropriate bridge connecting means. Such direct interconnection has been found to be the factor which has produced uniformly good results, although such direct interconnection has never heretofore been considered to be a necessity.

Figure 6:
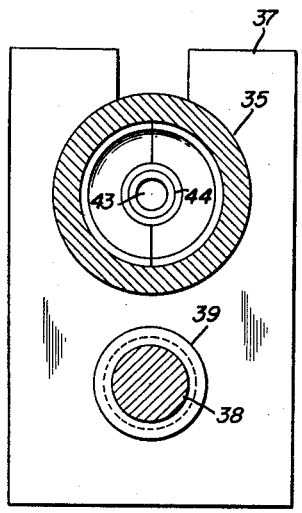
Figure 6 is a sectional view taken along line 6—6 of Figure 5.
Figure 7:
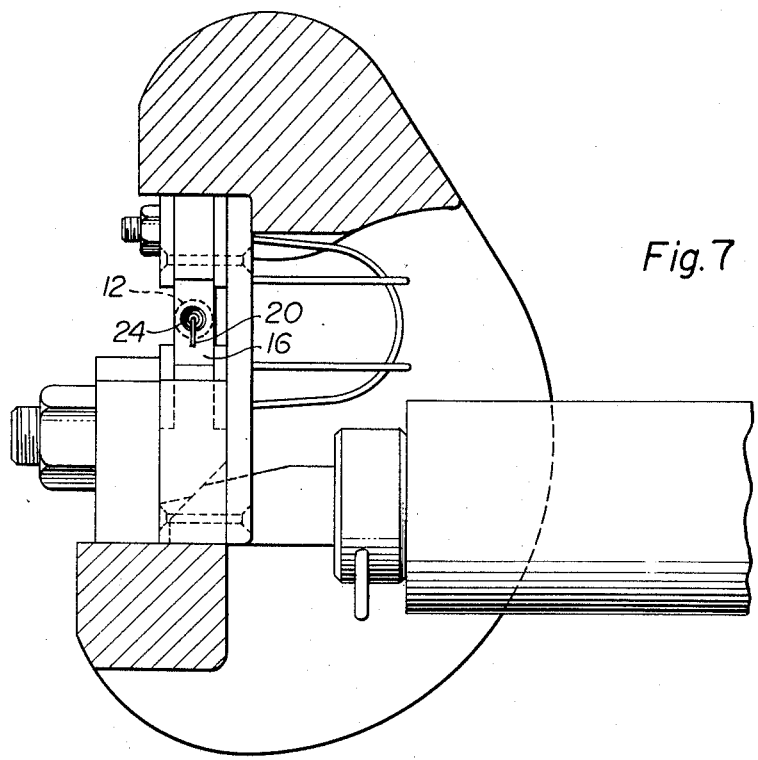
Figure 7 is a side view of the head portion of a press adapted to operate the guided die construction of this invention; and, Figure 8 is a front view of the press device of Figure 7.
Figure 8:
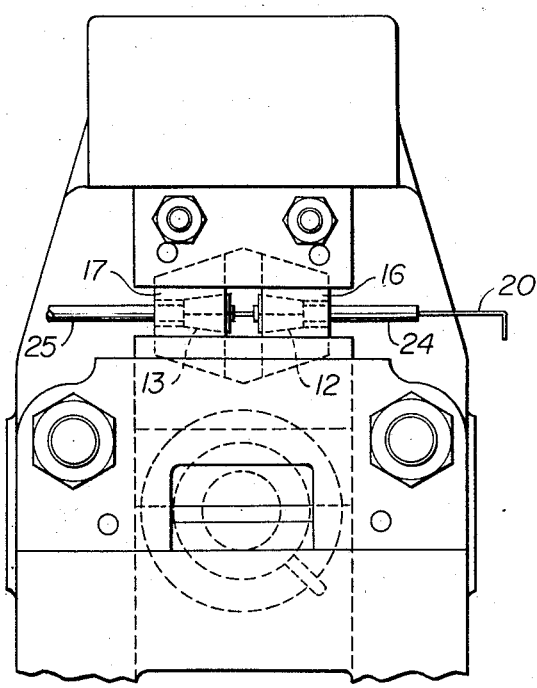

The Figure 5 further illustrates the preferred practice in the welding of small size tubing. Tubes 40 and 41 are provided with internal plug dies 42 and 43, but are not provided with a guiding rod such as the rod 20 shown in the Figures 1 through 4. Thus, the Figures 1 through 4 illustrate an axial interconnecting bridge means, whereas the Figures 5 and 6 illustrate bridge connecting means other than the axial bridge. In larger size tubing or tubing which requires extreme accuracy both alignment systems may be employed.

In addition to the foregoing discoveries and advantages, it has been found that the welding of tubes requires flash formation both to the interior of the tube as well as to the exterior of the tube in order to produce the necessary expansion of area with constant contact. Furthermore, there are instances in which it is desirable to completely block off the interior of the tube. An example of such instance is in the union of dissimilar metals which might have a tendency to corrode. Such blocking of the interior of the tubing aids in blocking moisture from intimate contact with the interface between the metals. Accordingly, in the preferred embodiment of the dies as illustrated, relief surfaces 46 and 47 are provided in the face of the dies 31 and 42, respectively, around the periphery of the cavity wherein the tube members are held. The surface 47 begins at the contact with the workpiece and recedes symmetrically therefrom in order to provide uniform relief surfaces around the interior of the tube. In the use of identical cooperating dies, both of the cooperating dies are formed identically, as illustrated in the drawings. Thus, a flash is produced as the workpieces are pressed together, and this flash is uniformly directed in a lateral direction, but is substantially pinched off at the end of the operation by the close proximity of the most forward portions of the dies at the junction of the workpiece surface. Accordingly, the flash may be easily stripped from the surface of the workpiece, and the outer diameter of the completely joined workpieces will be substantially the same as the original workpieces.

Although the invention has been described in its preferred form with a certain degree of particularity, it is understood that the present disclosure of the preferred form has been made only by way of example, and that numerous changes in the details of construction and the combination and arrangement of parts may be resorted to without departing from the spirit and the scope of the invention as hereinafter claimed.

We claim:

1. Tooling for uniting tubular members by pressing interfaces thereof together very intensely over a surface which is in movement, fixed in contact and expanding in area, comprising, first and second internal alignment and forming dies shaped to fit closely to the interior of a first and second tubular member to be joined, a rod guide rail extending axially of said first and second internal dies, at least one of said internal dies being longitudinally shiftable on said rod guide rail, first and second external dies each having a socket recess shaped to fit closely to the exterior of said first and second tubular members, means to close said first exterior and interior dies upon the first tubular member, means to close said second exterior and interior dies upon the second tubular member, said first and second exterior dies each having a flange forming abutment face relief recess encompassing said socket recess, said first and second internal dies each having a flange forming abutment face relief recess, said recesses of the first external and internal dies and the second external and internal dies cooperating to define a composite flange forming relief recess permitting abutting tubular members to expand in a defined and limited area under welding pressure, and drive means to drive said first exterior and interior dies as a unit and said second exterior and interior dies as a unit together under an intense regular force, whereby the guided first and second internal dies direct the tubular members into butt contact.

2. Tooling for uniting by cold pressure welding two tubular parts of cold pressure weldable material and of similar cross sectional dimensions in a butt joint with the tubular parts coaxial comprising, first and second internal mandrel members, first and second external split die members, the first members being individual to a first tubular part to grasp the part therebetween, the second members being individual to a second tubular part to grasp the second tubular part therebetween, and guide means for constraining the internal mandrel members and the external die members to move coaxially together upon the application of pressure to effect butt welding of the tubular parts, said first and second external dies each having a face surface, said face surfaces each having a flange forming abutment relief recess encompassing said tubes, said first and second internal mandrels each having a face surface, the face surfaces each having a flange forming abutment relief recess, said recesses of the dies cooperating to define an external composite flange forming relief recess, said recesses of said mandrels cooperating to define an internal composite flange forming relief recess, said flange forming relief recesses permitting abutting tubular members to expand in a defined and limited area under welding pressure.

3. Tooling for uniting by cold pressure welding two tubular parts of cold pressure weldable material and of similar cross sectional dimensions in a butt joint with the tubular parts coaxial comprising, first and second internal mandrel members, first and second external split die members, the first members being individual to a first tubular part to grasp the part therebetween, the second members being individual to a second tubular part to grasp the second tubular part therebetween, and guide means for constraining the internal mandrel members and the external die members to move coaxially together upon the application of pressure to effect butt welding of the tubular parts, said first and second external dies each having a face surface, said face surfaces each having a flange forming abutment relief recess encompassing said tubes, said first and second internal mandrels each having a face surface, the face surfaces each having a flange forming abutment relief recess, said recesses of the dies cooperating to define an external composite flange forming relief recess, said recesses of said mandrels cooperating to define an internal composite flange forming relief recess, said flange forming relief recesses permitting abutting tubular members to expand in a defined and limited area under welding pressure, said first and second dies when in closed position presenting the face surfaces substantially in contact adjacent said tubes, whereby the middle of the tube workpieces is caused to remain in fixed contact and expand constantly in an area as the dies close, and a flange is formed within the tube and on the exterior of the tube, but the flange is substantially pinched off in the final position of the dies.

4. Tooling for uniting tubular members by pressing interfaces together very intensely over a surface which is in movement, fixed in contact and expanding in area comprising, first and second composite holding and forming dies, said first and second dies each comprising a die body portion having a tube receiving socket therein, a first tube supporting and guiding mandrel positional within said first die socket, a second tube supporting and guiding mandrel positional within said second die socket, said first die socket and said first mandrel together defining a first annular space to receive a first tubular member, said second die socket and said second mandrel together defining a second annular space to receive a second tubular member, means to close said annular space and grasp a tube positioned in said space, each of said die body portions having an annular face flange relief surface surrounding said tube receiving annular space, each of said mandrels having a relief recess formed in a face and thereof from the peripheral edge of the mandrel inwardly, the relief surfaces of the die defining a flange forming guide of increasing longitudinal dimension as measured from the annular spaces outwardly, said mandrel relief recesses together defining a substantially symmetrical flange forming guide of increasing longitudinal dimension as measured from said annular spaces inwardly, said first and second dies when in closed position presenting the face surfaces substantially in contact adjacent said annular spaces, whereby the middle of the tube workpieces is caused to remain in fixed contact and expand constantly in an area as the dies close, and a flange is formed within the tube and on the exterior of the tube, but the flange is substantially pinched off in the final position of the dies, said first and said second dies each having a cylindrically contoured external guide surface concentrically disposed about said annular spaces and external of said die face flange relief surfaces, and ring guide means coactable with said die guide surfaces to retain the dies in coaxial relationship during a weld forming operation.

5. In the tooling defined in claim 2, said first and second exterior split dies having annular guide surfaces external of the guide face flange relief surfaces, and a ring as said guide means, which ring is coactable with the guide surface to retain the dies in coaxial relationship during a weld formation operation.

6. In the tooling defined in claim 3, said first and second exterior split dies having annular guide surfaces external of the guide face flange relief surfaces, and a ring as said guide means, which ring is coactable with the guide surfaces to retain the dies in coaxial relationship during a weld formation operation.

References Cited in the file of this patent

UNITED STATES PATENTS

| | | |
|---|---|---|
| 1,458,906 | Morisette | June 12, 1923 |
| 1,613,595 | Abel | Jan. 11, 1927 |
| 1,691,879 | Blakeslee | Nov. 13, 1928 |
| 1,998,509 | Keith | Apr. 23, 1935 |
| 2,042,375 | Abel | May 26, 1936 |
| 2,051,900 | Rosner | Aug. 25, 1936 |
| 2,332,704 | Enes et al. | Oct. 26, 1943 |
| 2,344,939 | Bennett | Mar. 28, 1944 |
| 2,415,987 | Bissout et al. | Feb. 18, 1947 |
| 2,438,999 | Hartley | Apr. 16, 1948 |
| 2,608,887 | Sowter | Sept. 12, 1952 |
| 2,707,823 | Sowter | May 10, 1955 |
| 2,707,826 | Sowter | May 10, 1955 |

FOREIGN PATENTS

| | | |
|---|---|---|
| 10,727 | Great Britain | May 8, 1906 |
| 65,235 | Denmark | Dec. 16, 1946 |
| 266,161 | Switzerland | Apr. 1, 1950 |
| 440,840 | Germany | Feb. 17, 1927 |
| 478,509 | Canada | Nov. 3, 1951 |
| 663,404 | Great Britain | Dec. 19, 1951 |
| 679,195 | Great Britain | Sept. 17, 1952 |

OTHER REFERENCES

"Pressure Welding" (Kelley), August 1951, Welding Journal.